(12) United States Patent
Moon

(10) Patent No.: US 10,586,958 B2
(45) Date of Patent: Mar. 10, 2020

(54) PACKING TRAY FOR RECHARGEABLE BATTERY

(71) Applicant: Samsung SDI Co., Ltd., Yongin-si, Gyeonggi-do (KR)

(72) Inventor: Jin-Young Moon, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 266 days.

(21) Appl. No.: 14/731,929

(22) Filed: Jun. 5, 2015

(65) Prior Publication Data

US 2016/0028054 A1   Jan. 28, 2016

(30) Foreign Application Priority Data

Jul. 24, 2014  (KR) .......................... 10-2014-0094172

(51) Int. Cl.
*H01M 2/10* (2006.01)
*B65D 5/50* (2006.01)

(52) U.S. Cl.
CPC .......... *H01M 2/105* (2013.01); *B65D 5/5076* (2013.01)

(58) Field of Classification Search
CPC .............................. H01M 2/105; B65D 5/7056
See application file for complete search history.

(56) References Cited

U.S. PATENT DOCUMENTS

| 5,029,705 A | * | 7/1991 | Schmidt | B65D 75/323 |
| | | | | 206/470 |
| 2001/0052478 A1 | * | 12/2001 | Casanova | B65D 73/0092 |
| | | | | 206/703 |
| 2002/0043555 A1 | * | 4/2002 | Mader | B65D 3/04 |
| | | | | 229/400 |
| 2004/0129732 A1 | * | 7/2004 | Kutner | B65D 5/3607 |
| | | | | 222/185.1 |
| 2014/0127543 A1 | * | 5/2014 | Cho | H01M 2/1016 |
| | | | | 429/99 |

FOREIGN PATENT DOCUMENTS

| JP | 2008-222293 A | | 9/2008 | |
| JP | 2013073845 A | * | 4/2013 | ............ H02J 7/0013 |
| KR | 20-0410872 Y1 | | 3/2006 | |
| KR | 30-0422715 S | | 8/2006 | |

OTHER PUBLICATIONS

Machine translation of JP 2013073845 A, Shikano, Hiroshi, Japan Apr. 2013.*

* cited by examiner

*Primary Examiner* — Sarah A. Slifka
*Assistant Examiner* — Brent C Thomas
(74) *Attorney, Agent, or Firm* — Knobbe Martens Olson & Bear LLP

(57) ABSTRACT

A packing tray for a rechargeable battery is disclosed. In one aspect, the tray includes a bottom portion and an inner wall connected to the bottom portion. The bottom portion and the inner wall define a receiving space configured to receive a battery cell. The inner wall includes upper and lower portions. The lower portion extends upwardly, and the upper portion is outwardly curved such that the upper portion is wider than the lower portion.

17 Claims, 7 Drawing Sheets

PACKING TRAY FOR RECHARGEABLE BATTERY

INCORPORATION BY REFERENCE TO ANY PRIORITY APPLICATIONS

This application claims priority to and the benefit of Korean Patent Application No. 10-2014-0094172 filed in the Korean Intellectual Property Office on Jul. 24, 2014, the entire contents of which are incorporated herein by reference.

BACKGROUND

Field

The described technology generally relates to a packing tray for rechargeable batteries.

Description of the Related Technology

Demand for rechargeable batteries as an energy source has been increasing as development for mobile devices has increased. Rechargeable batteries can be classified into cylindrical, angular, and pouch type rechargeable batteries. For long-distance and safe transfer of the rechargeable batteries, various packing mechanisms can be used.

As one example, one external paper box, a plurality of middle boxes inserted in the outer box, and a plurality of inner boxes inserted in each of the plurality of middle boxes are used to pack the cylindrical rechargeable batteries.

In addition, a cell barrier member that separately receives the cylindrical rechargeable batteries for each battery cell is used in the inner box. The cell barrier member is made of paper to ease friction and impact that can occur between neighboring battery cells.

In addition, a shock-absorbing member is used between the inner boxes to pack the cylindrical rechargeable battery. The shock-absorbing member can be made of sponge material, and absorbs impact between the inner boxes to protect the battery cells from external impact and reinforce compression strength.

SUMMARY OF CERTAIN INVENTIVE ASPECTS

One inventive aspect is a rechargeable battery packing tray packing a plurality of battery cells.

Another aspect is a rechargeable battery packing tray that can reduce cost for packing battery cells.

Another aspect is a rechargeable battery packing tray that includes: a bottom and an inner wall connected together to set a receiving space for receiving a battery cell; and an outer wall connected to one side of the inner side through a connection portion and separated from the inner wall at the opposite side of the connection portion, wherein the inner wall forms a stepped portion that is more opened than the receiving space in at least one side of a length direction of the receiving space between the connection portion and the bottom.

The stepped portion can be connected to the bottom through a reinforcement wall.

The reinforcement wall can include a support protrusion protruding toward the receiving space and supporting lateral ends in the length direction of the battery cell.

The battery cell can be formed in a cylindrical shape, and the bottom can be formed in the shape of a curved surface corresponding to the cylindrically shaped battery cell.

The bottom can include an impact absorbing portion protruding to an outer side of the receiving space to set a first height difference $\Delta H1$ with the bottom.

The outer wall can have a second height difference $\Delta H2$ with the bottom.

The outer wall can further include a reinforcing portion formed concave and convex along a circumference thereof and extended toward the bottom side from the connection portion.

The receiving space can be provided in plural and arranged in one column along a direction that crosses the length direction of the battery cell.

The column of the receiving spaces can be arranged in a plurality of rows along the length direction of the battery cell.

The bottom, the inner wall, the connection portion, and the outer wall can be formed of acrylonitrile butadiene styrene (ABS), a resin, polyethylene terephthalate (PET), polystyrene (PS), or pulp.

Another aspect is a rechargeable battery packing tray comprising a bottom portion and an inner wall connected to the bottom portion. The bottom portion and the inner wall define a receiving space configured to receive a battery cell, wherein the inner wall includes upper and lower portions, wherein the lower portion extends upwardly, and wherein the upper portion is outwardly curved such that the upper portion is wider than the lower portion.

The above tray further comprises a side portion connected to the bottom portion and the inner wall.

The above tray further comprises a support portion protruding toward the receiving space and configured to support ends of the battery cell.

In the above tray, the battery cell is substantially cylindrical, wherein the bottom portion has a curved surface corresponding to the battery cell.

The above tray further comprises an impact absorbing portion extending downwardly to be farther away from the bottom portion.

The above tray further comprises an outer wall extending from the inner wall and having a height less than that of the inner wall.

In the above tray, the outer wall comprises a plurality of concave and convex portions alternately formed along a circumference of the rechargeable battery packing tray.

In the above tray, the receiving space is provided in plurality in a row along a direction that crosses the length direction of the battery cell.

In the above tray, the rows of the receiving spaces are arranged in plurality.

In the above tray, the lower portion of the inner wall is configured to contact an end of the battery cell, and wherein the upper portion is configured to not contact the end of the battery cell.

In the above tray, the lower portion of the inner wall is substantially linear.

In the above tray, the upper and lower portions of the inner wall have substantially the same height.

Another aspect is a rechargeable battery packing tray comprising a bottom portion and a plurality of inner walls connected to the bottom portion, wherein the bottom portion and the inner walls define a plurality of receiving spaces each configured to accommodate a battery cell. Each receiving space has two opposing ends configured to contact two opposing ends of the battery cell, wherein the lower portion of each inner wall extends upwardly and the upper portion of the inner wall is outwardly curved such that the upper portion is wider than the lower portion.

In the above tray, the receiving space has a curved surface corresponding to the battery cell which is substantially cylindrical.

In the above tray, the bottom portion comprises an impact absorbing portion protruding to an outer side of the receiving space, wherein there is a first height difference between the bottom and impact absorbing portions.

The above tray further comprises a plurality of impact absorbing portions extending downwardly to be farther away from the bottom portion.

In the above tray, the lower portion of each inner wall is configured to contact at least one of the opposing ends of the battery cell, and wherein the upper portion is configured to not contact the opposing ends of the battery cell.

In the above tray, the lower portion of each inner wall is substantially linear.

In the above tray, the upper portion has a height greater than that of the lower portion.

In the above tray, the upper and lower portions of each inner wall have substantially the same height.

According to at least one of the disclosed embodiments, the receiving space is formed by the bottom and the inner wall and the tray is formed by connecting the outer wall to the inner wall with a connection portion so that the battery cells can be packed in the receiving space, and the tray is recyclable so that cost for packing the battery cells can be reduced.

DETAILED DESCRIPTION OF CERTAIN INVENTIVE EMBODIMENTS

Figure 1:
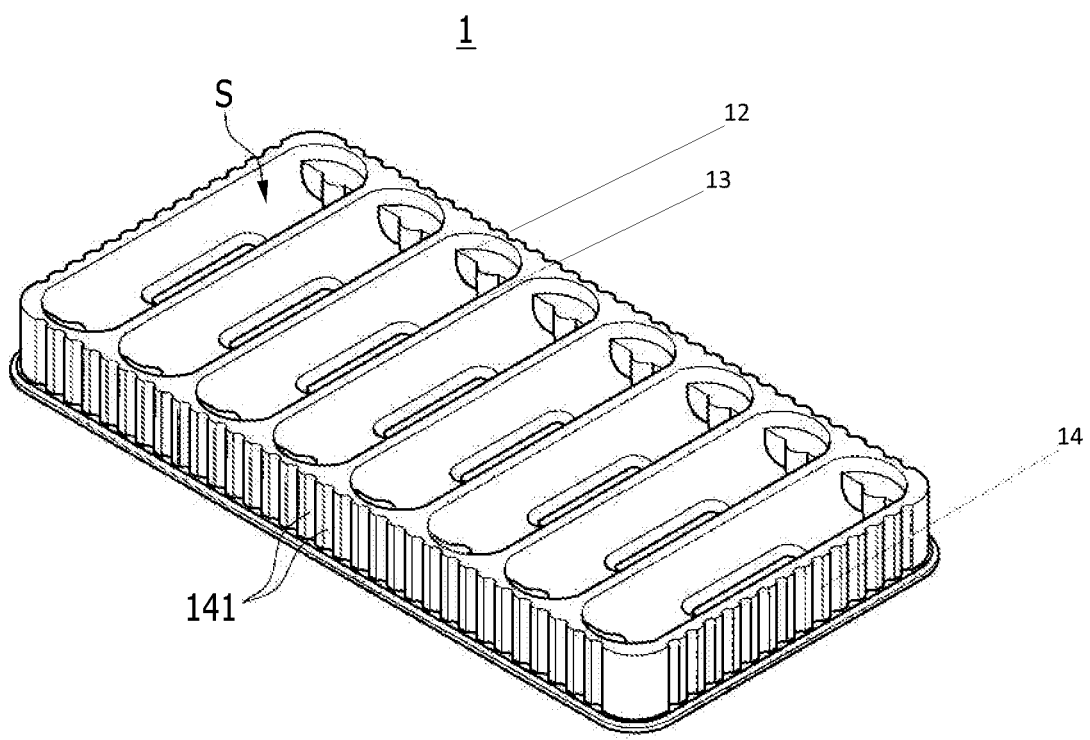
FIG. 1 is a perspective view of a rechargeable battery packing tray according to a first exemplary embodiment.

A cell barrier member and a shock-absorbing member can complicate packing of rechargeable batteries, increase material cost, and require much time for insertion of battery cells into inner boxes of packing trays or separation of the battery cell from the inner boxes. In addition, the cell barrier member and the shock-absorbing member are disposable which further increases costs.

The described technology will be described more fully hereinafter with reference to the accompanying drawings, in which exemplary embodiments are shown. As those skilled in the art would realize, the described embodiments can be modified in various different ways, all without departing from the spirit or scope of the described technology. The drawings and description are to be regarded as illustrative in nature and not restrictive. Like reference numerals designate like elements throughout the specification. In this disclosure, the term "substantially" includes the meanings of completely, almost completely or to any significant degree under some applications and in accordance with those skilled in the art. Moreover, "formed on" can also mean "formed over." The term "connected" can include an electrical connection.

Figure 2:
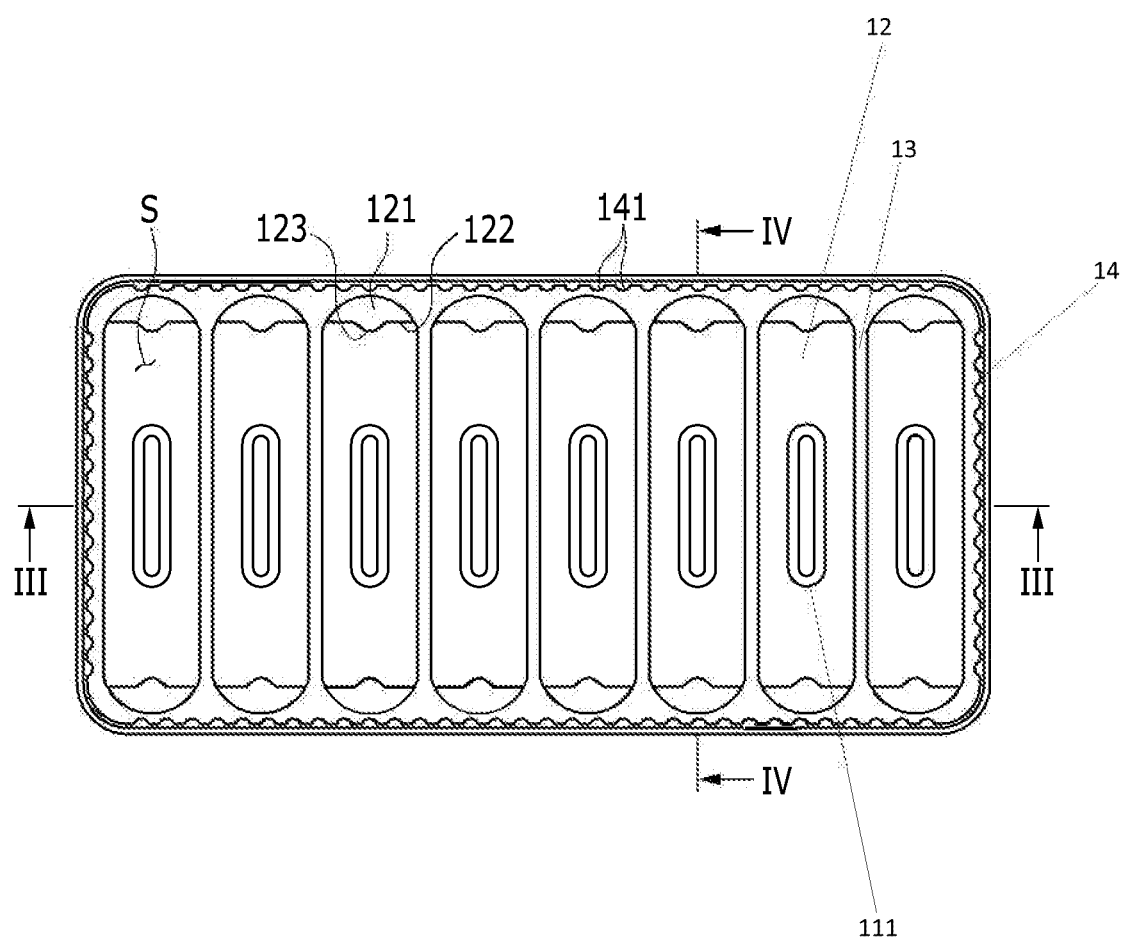
FIG. 2 is a top plan view of FIG. 1.

FIG. 1 is a perspective view of a rechargeable battery packing tray according to a first exemplary embodiment. FIG. 2 is a top plan view of FIG. 1. Referring to FIG. 1 and FIG. 2, a rechargeable battery packing tray 1 has a receiving space S that receives a battery cell. As one example, the receiving space S is provided in plurality along a direction that crosses a length direction of a battery call C of FIG. 3. The receiving spaces S can be arranged in one column.

Figure 3:
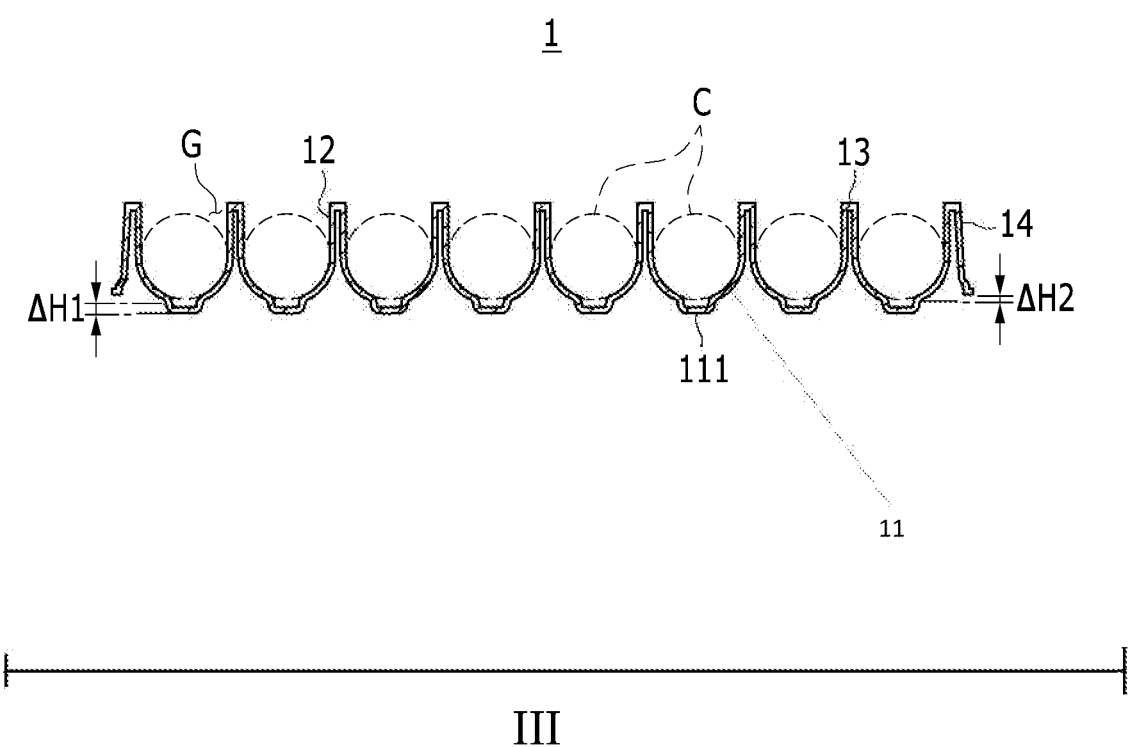
FIG. 3 is a cross-sectional view of FIG. 2, taken along the line III-III.

FIG. 3 is a cross-sectional view of FIG. 2, taken along the line III-III. As one example, referring to FIG. 3, the rechargeable battery packing tray 1 is provided with eight receiving spaces S for receiving eight rechargeable batteries, that is, eight battery cells C. The number and the size of the receiving spaces can vary depending on applications.

Figure 4:
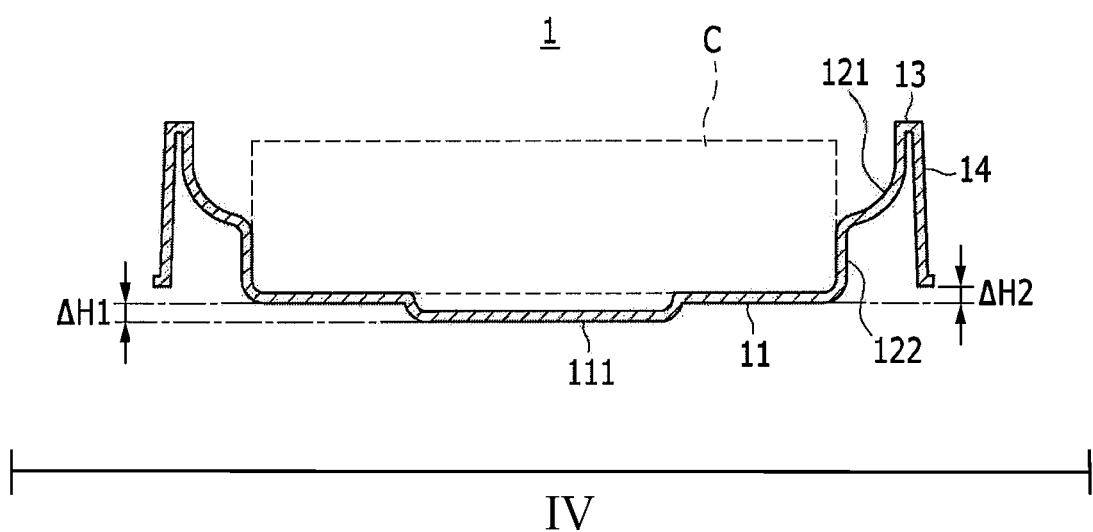
FIG. 4 is a cross-sectional view of FIG. 3, taken along the line IV-IV.

FIG. 4 is a cross-sectional view of FIG. 3, taken along the line IV-IV. Referring to FIGS. 3 and 4, the rechargeable battery packing tray 1 includes a bottom or bottom portion 11, an inner wall 12, and an outer wall 14. The bottom 11 and the inner wall 12 set the receiving space S and are connected with each other, and the outer wall 14 is connected to one side of the inner wall 12 at a distance from the inner wall 12 through a connection portion 13. That is, the inner wall 12 and the outer wall 14 form a double-layered receiving space S including first and second layers.

The bottom 11, the inner wall 12, the connection portion 13, and the outer wall 14 of the rechargeable battery packing tray 1 can be formed of acrylonitrile butadiene styrene (ABS), a resin, polyethylene terephthalate (PET), polystyrene (PS), or pulp. That is, the rechargeable battery packing tray 1 is recyclable so that the cost for packing the battery cell C can be reduced.

The battery cell C can be formed as a cylindrical rechargeable battery. The bottom 11 can be a curved surface corresponding to an external circumferential surface of the cylindrical battery cell C. While the battery cell C is inserted into the receiving space C, the bottom 11 supports the external circumferential surface at one side with the curved surface. Thus, the battery cell C is supported by a wide area of the bottom 11 of the receiving space S, thereby being maintained in a stable state.

A plurality of the inner walls 12 extend substantially parallel to each other and upwardly from the bottom 11. The inner walls 12 are formed at lateral sides of a curved bottom 11 and partially support a side surface of the battery cell C. Thus, the inner walls 12 facing each other form a gap G separated from the battery cell C as shown in FIG. 3.

In addition, the inner wall 12 further forms a substantially stepped portion or an outwardly curved portion or a curved portion 121 that is wider than the receiving space S between the connection portion 13 and the bottom 11. The stepped portion 121 facilitates handling of the battery cell C inserted to the receiving space S, thereby simplifying insertion and separation of the battery cell C. In some embodiments, the stepped portion 121 is provided at both sides of the receiving space S for easy insertion and separation of the battery cell C.

The stepped portions 121 are connected to the bottom 11 through a reinforcement wall 122. The reinforcement wall 122 connects the stepped portion 121 to the bottom 11 to rigidly support lateral ends along the length direction of the battery cell C. That is, the battery cell C can firmly maintain a state of being tightly fitted to the receiving space S by the bottom 11, the inner wall 12, and the reinforcement wall 122. The curved portion 121 corresponds to an upper portion of the inner wall, and the reinforcement wall 122 corresponds to a lower portion of the inner wall. The upper portion can have a height substantially the same as that of the lower portion. The upper and lower portions can have substantially the same height. The lower portion can be substantially linear.

Referring back to FIG. 2, the reinforcement wall 122 includes a support protrusion 123 that protrudes toward the receiving space S to support the length directional lateral ends of the battery cell C. The support protrusions 123 protrude toward the reinforcement walls 122 facing each other to support lateral ends of the battery cell C. The support protrusion 123 supports a narrow contact area at the length directional lateral ends of the battery cell C compared to the width of the reinforcement wall 122 such that a worker can feel resistance in when inserting and removing the battery cell C.

Referring to FIGS. 3 and 4, the bottom 11 includes an impact absorbing portion 111 protruding to an outer side of the receiving space S. There is a first height difference ΔH1 from a first layer of the bottom 11 to a second layer of the bottom 11. When the rechargeable battery packing tray 1 is inserted into a packing box (not shown), the impact absorbing portion 111 is supported by the packing box and absorbs shock caused by an external impact transmitted through the packing box to thereby protect the battery cell C from the external impact.

In addition, there is a second height difference ΔH2 from the outer wall 14 to the bottom 11. Due to the external impact transmitted to the bottom 11, the inner wall 12 is compressed toward the connection portion 13 by as much as the second height difference ΔH2, and in this state, the external impact can be absorbed while the external wall 14 is being supported. Thus, the rechargeable battery packing tray 1 can absorb the external impact in stages with the first and second height differences ΔH1 and ΔH2.

Referring back to FIG. 1 and FIG. 2, the outer wall 14 further includes a reinforcement portion or side portion 141 that is concave and convex along a circumference of the rechargeable battery packing tray 1. The reinforcement portion 141 extends toward the bottom 11 from the connection portion 13. When the external impact is absorbed, the outer wall 14 maintains a state of the rechargeable battery packing tray 1 so that the battery cell C inserted into the receiving space S can be protected.

The reinforcement portion 141 extends along the height direction of the outer wall 14, and therefore, strength applied along the height direction of the outer wall 14 can be enhanced. A plurality of rechargeable battery packing trays 1 can be inserted to the packing box (not shown) and thus receive a load according to stacking of the packing boxes.

Figure 5:
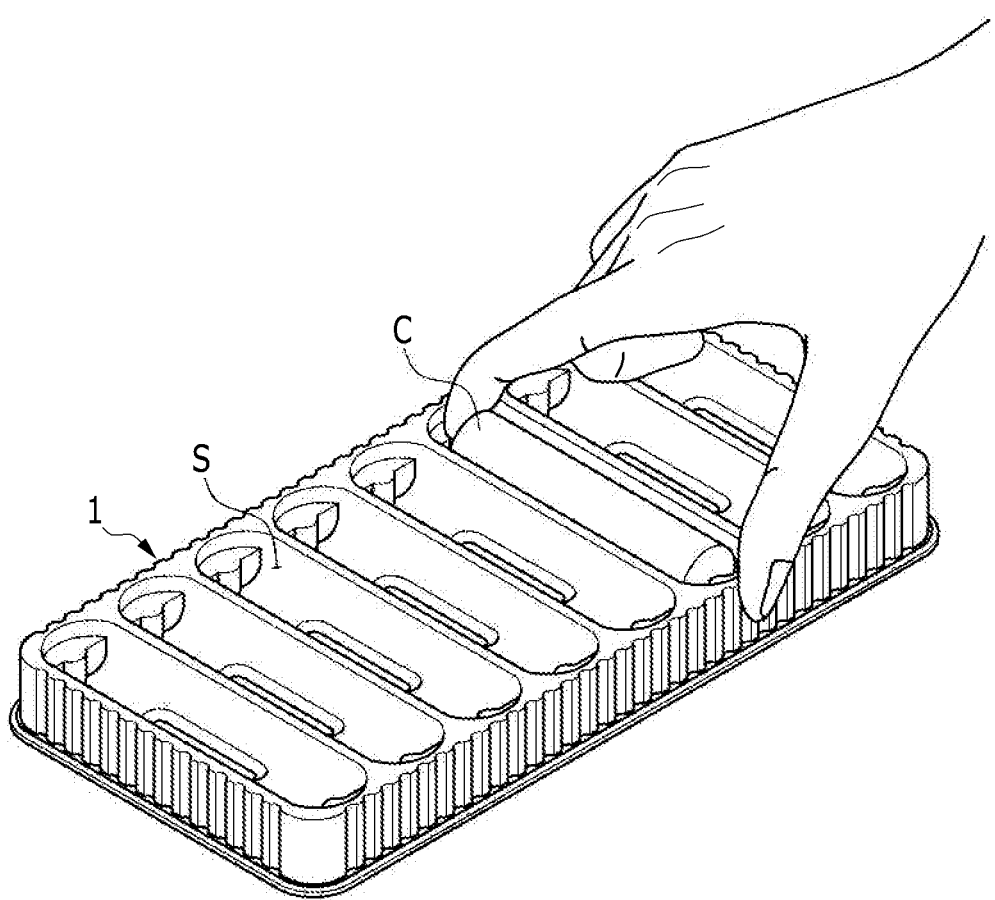
FIGS. 5-6 are diagrams of a rechargeable battery packing tray in use.
Figure 6:
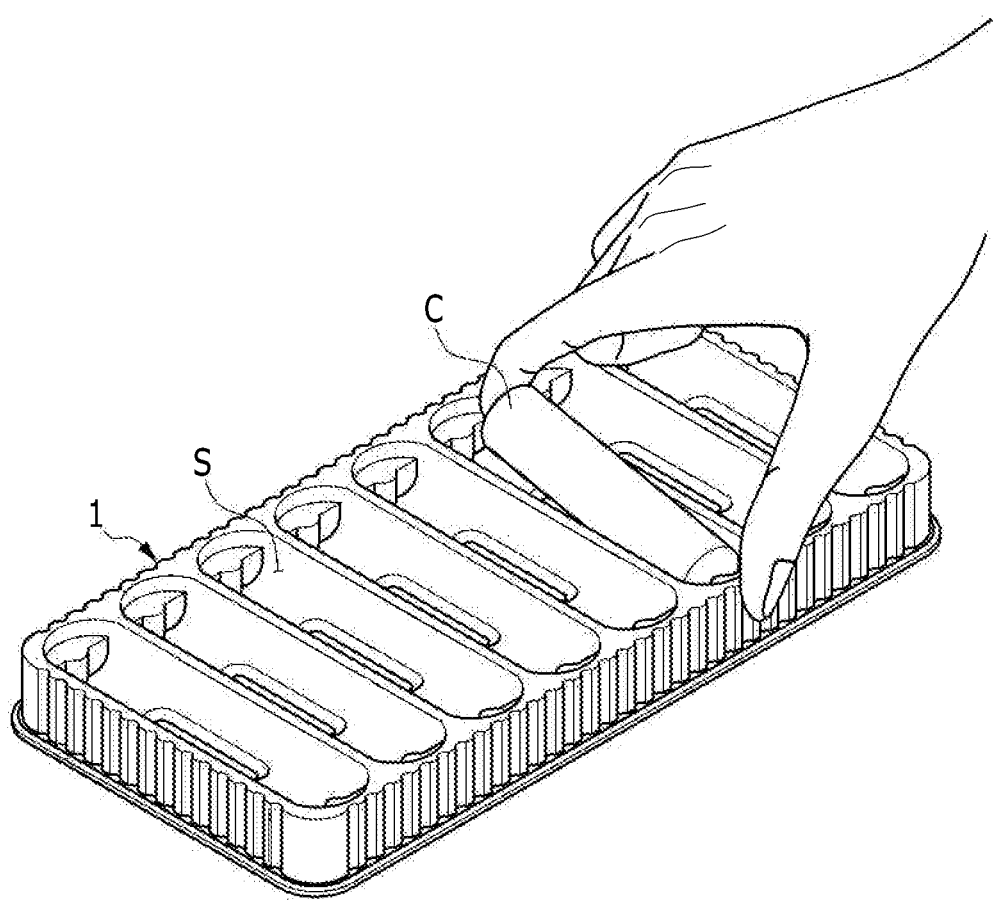

FIGS. 5 and 6 are diagrams of the rechargeable battery packing tray 1 in use. FIG. 5 shows a start state in which the battery cell is separated from the rechargeable battery packing tray 1. FIG. 6 shows one side of the battery cell subsequent to the start state of FIG. 5.

Referring to FIGS. 5 and 6, the worker inserts a finger into the stepped portion 121 of the rechargeable battery packing tray 1. The worker tilts the battery cell C toward the worker to separate the battery cell from the receiving space S.

In addition, the worker inserts one length directional end of the battery cell C to the stepped portion 121 of the rechargeable battery packing tray 1 and presses the battery cell C against the rechargeable battery packing tray 1 to insert the battery cell C to the receiving space S.

As described, the rechargeable battery packing tray 1 can simplify insertion and separation of the battery cell C to and from the receiving space S.

Hereinafter, a second exemplary embodiment will be described. A description of the same configurations as those of the first exemplary embodiment described above will be omitted, and different configurations from those of the first exemplary embodiment described above will be described.

Figure 7:
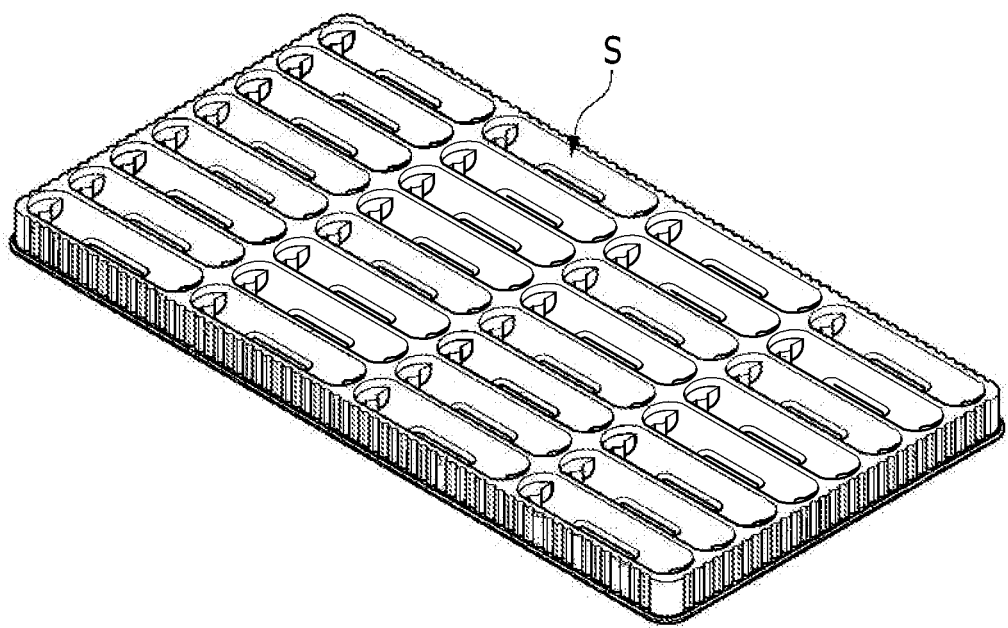
FIG. 7 is a perspective view of a rechargeable battery packing tray according to a second exemplary embodiment.

FIG. 7 is a perspective view of a rechargeable battery packing tray according to the second exemplary embodiment. Referring to FIG. 7, columns of the receiving spaces S are arranged in a plurality of rows along a length direction of a battery cell in the rechargeable battery packing tray 2. The number of the rows and the number of the columns can vary depending on applications. Furthermore, the size of the receiving spaces can vary depending on embodiments.

The rechargeable battery packing tray 2 forms a structure in which five rechargeable battery packing trays 1 are connected. That is, the rechargeable battery packing tray 2 form more receiving spaces S of the battery cell so that packing volume thereof can be increased.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery packing tray comprising:
a bottom portion;
an inner wall connected to the bottom portion, wherein the bottom portion and the inner wall define a receiving space configured to receive a battery cell, wherein the inner wall includes upper and lower portions, wherein the lower portion extends upwardly, and wherein the upper portion is outwardly curved such that the upper portion is wider than the lower portion;
an outer wall extending from and connected to the inner wall via a connection portion; and
an impact absorbing portion extending downwardly to be farther away from the bottom portion, wherein the impact absorbing portion is formed directly below and downwardly extends from the receiving space, and wherein the impact absorbing portion has a groove centered on the battery cell and configured to define a vertical air gap,
wherein the groove has an inner surface inside the receiving space and an outer surface opposing the inner surface and exposed to the environment, wherein the inner surface of the groove directly and continuously extends from the bottom portion within the receiving space such that the inner surface of the groove and the bottom portion form a single piece structure, the inner surface of the groove configured to directly face and to be positioned directly below the battery cell within the receiving space so as to absorb an external impact when the battery cell is placed in the receiving space,
wherein a first height difference is defined between a bottom surface of the bottom portion and a bottom surface of the impact absorbing portion,
wherein the outer wall has a height less than that of the inner wall so as to define a second height difference between a bottom surface of the outer wall and the bottom surface of the bottom portion, and
wherein the rechargeable battery packing tray is configured to absorb the external impact in stages with the first and second height differences.

2. The rechargeable battery packing tray of claim 1, further comprising a side portion connected to the bottom portion and the inner wall.

3. The rechargeable battery packing tray of claim 2, further comprising a support portion protruding toward the receiving space and configured to support ends of the battery cell.

4. The rechargeable battery packing tray of claim 1, wherein the battery cell is substantially cylindrical, and wherein the bottom portion has a curved surface corresponding to the battery cell.

5. The rechargeable battery packing tray of claim 1, wherein the bottom portion extends in a first direction, and wherein the outer wall and the upper portion of the inner wall overlap each other in the first direction.

6. The rechargeable battery packing tray of claim 5, wherein the outer wall comprises a plurality of concave and convex portions alternately formed along a circumference of the rechargeable battery packing tray.

7. The rechargeable battery packing tray of claim 1, wherein the receiving space is provided in plurality in a row along a direction that crosses the length direction of the battery cell.

8. The rechargeable battery packing tray of claim 7, wherein the rows of the receiving spaces are arranged in plurality.

9. The rechargeable battery packing tray of claim 1, wherein the lower portion of the inner wall is configured to contact an end of the battery cell, and wherein the upper portion is configured to not contact the end of the battery cell.

10. The rechargeable battery packing tray of claim 1, wherein the lower portion of the inner wall is substantially linear.

11. The rechargeable battery packing tray of claim 1, wherein the upper and lower portions of the inner wall have substantially the same height.

12. A rechargeable battery packing tray comprising:
a bottom portion;
a plurality of inner walls connected to the bottom portion, wherein the bottom portion and the inner walls define a plurality of receiving spaces each configured to accommodate a battery cell, wherein each receiving space has two opposing ends configured to contact two opposing ends of the battery cell, and wherein the lower portion of each inner wall extends upwardly and the upper portion of the inner wall is outwardly curved such that the upper portion is wider than the lower portion;
a plurality of outer walls extending from and connected to the inner walls via connection portions; and
a plurality of impact absorbing portions respectively formed in the plurality of receiving spaces and extending downwardly to be farther away from the bottom portion, wherein each of the impact absorbing portions is formed directly below and downwardly extends from the respective receiving space, and wherein each of the impact absorbing portions has a groove centered on the battery cell and configured to define a vertical air gap,
wherein the groove has an inner surface inside the receiving space and an outer surface opposing the inner surface and exposed to the environment, wherein the inner surface of the groove directly and continuously extends from the bottom portion within the receiving space such that the inner surface of the groove and the bottom portion form a single piece structure, the inner surface of the groove configured to directly face and to be positioned directly below the battery cell within the receiving space so as to absorb an external impact when the battery cell is placed in the receiving space,
wherein a first height difference is defined between a bottom surface of the bottom portion and a bottom surface of the impact absorbing portion,
wherein each of the outer walls has a height less than that of a corresponding inner wall so as to define a second height difference between a bottom surface of each outer wall and the bottom surface of the bottom portion, and
wherein the rechargeable battery packing tray is configured to absorb the external impact in stages with the first and second height differences.

13. The rechargeable battery packing tray of claim 12, wherein the receiving space has a curved surface corresponding to the battery cell which is substantially cylindrical.

14. The rechargeable battery packing tray of claim 12, wherein the lower portion of each inner wall is configured to contact at least one of the opposing ends of the battery cell, and wherein the upper portion is configured to not contact the opposing ends of the battery cell.

15. The rechargeable battery packing tray of claim 12, wherein the lower portion of each inner wall is substantially linear.

16. The rechargeable battery packing tray of claim 12, wherein the upper portion has a height greater than that of the lower portion.

17. The rechargeable battery packing tray of claim 12, wherein the upper and lower portions of each inner wall have substantially the same height.

* * * * *